US010789258B2

(12) United States Patent
Tas et al.

(10) Patent No.: US 10,789,258 B2
(45) Date of Patent: Sep. 29, 2020

(54) SYSTEMS AND METHODS FOR CONTENT PRESENTATION

(71) Applicant: Facebook, Inc., Menlo Park, CA (US)

(72) Inventors: Mahmud Sami Tas, Mountain View, CA (US); Vibhi Kant, San Francisco, CA (US); Gregory Matthew Marra, San Francisco, CA (US); Dean Griffin Eckles, San Francisco, CA (US); Yaroslav O. Dudin, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 613 days.

(21) Appl. No.: 14/975,433

(22) Filed: Dec. 18, 2015

(65) Prior Publication Data

US 2017/0177578 A1  Jun. 22, 2017

(51) Int. Cl.
*G06F 16/00* (2019.01)
*G06F 16/2457* (2019.01)
*H04W 12/08* (2009.01)
*H04W 4/21* (2018.01)
*G06N 20/00* (2019.01)

(52) U.S. Cl.
CPC ........ *G06F 16/24578* (2019.01); *H04W 4/21* (2018.02); *H04W 12/08* (2013.01); *G06N 20/00* (2019.01)

(58) Field of Classification Search
CPC .......... G06F 17/3053; G06F 16/24578; G06N 7/005; G06N 20/00; H04L 67/10; H04W 12/08; H04W 12/0802; H04W 12/0804; H04W 4/21
See application file for complete search history.

(56) References Cited

U.S. PATENT DOCUMENTS

| | | | |
|---|---|---|---|
| 9,026,592 B1* | 5/2015 | Marra | H04L 29/06414 709/204 |
| 9,454,519 B1* | 9/2016 | Keysers | G06F 16/48 |
| 2010/0268661 A1* | 10/2010 | Levy | G06Q 30/02 705/347 |
| 2010/0332346 A1* | 12/2010 | Embree | G06Q 30/02 705/26.35 |
| 2012/0054200 A1* | 3/2012 | Hassan | G06F 16/335 707/748 |
| 2012/0323909 A1* | 12/2012 | Behforooz | G06F 16/24578 707/728 |
| 2013/0290430 A1* | 10/2013 | Yung | G06F 17/211 709/204 |
| 2014/0040010 A1* | 2/2014 | Garcia-Martinez | G06Q 30/02 705/14.43 |

(Continued)

*Primary Examiner* — Shew Fen Lin
(74) *Attorney, Agent, or Firm* — Sheppard Mullin Richter & Hampton LLP

(57) ABSTRACT

Systems, methods, and non-transitory computer-readable media can obtain at least one content item to be scored with respect to a user, wherein the score is used to determine whether the content item is included in a content feed of the user. A value for a first event is determined based at least in part on a likelihood of the user performing an action with respect to the content item, wherein the likelihood of the user performing the action is greater than an average user of the social networking system. The score for the content item is determined based at least in part on the value for the first event, wherein the first value is dampened to reduce its contribution to the score.

20 Claims, 7 Drawing Sheets

(56) References Cited

U.S. PATENT DOCUMENTS

| | | | |
|---|---|---|---|
| 2014/0156744 A1* | 6/2014 | Hua | G06Q 30/0251 |
| | | | 709/204 |
| 2014/0172877 A1* | 6/2014 | Rubinstein | G06F 17/30867 |
| | | | 707/748 |
| 2017/0124468 A1* | 5/2017 | Bolshinsky | G06N 5/047 |
| 2017/0185652 A1* | 6/2017 | Bolshinsky | G06F 17/30528 |

* cited by examiner

SYSTEMS AND METHODS FOR CONTENT PRESENTATION

FIELD OF THE INVENTION

The present technology relates to the field of content presentation. More particularly, the present technology relates to techniques for presenting content items through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content provider platform (e.g., a social networking system). Users can operate their computing devices to access the content items through the platform. Typically, the content items can be provided, or uploaded, by various entities including, for example, content publishers and also users of the content provider platform.

SUMMARY

Various embodiments of the present disclosure can include systems, methods, and non-transitory computer readable media configured to obtain at least one content item to be scored with respect to a user, wherein the score is used to determine whether the content item is included in a content feed of the user. A value for a first event is determined based at least in part on a likelihood of the user performing an action with respect to the content item, wherein the likelihood of the user performing the action is greater than an average user of the social networking system. The score for the content item is determined based at least in part on the value for the first event, wherein the first value is dampened to reduce its contribution to the score.

In an embodiment, the systems, methods, and non-transitory computer readable media are configured to determine a product of the likelihood of the user performing the first action with respect to the content item and a corresponding weight for the first action.

In an embodiment, the action involves the user performing one of: a like action with respect to the content item, a hide action with respect to the content item, a share action with respect to the content item, a comment action with respect to the content item, or viewing the content item.

In an embodiment, the systems, methods, and non-transitory computer readable media are configured to determine a value for a second event based at least in part on a likelihood of the user performing a second action with respect to the content item and to determine the score for the content item based at least in part on a sum of the value and the second value.

In an embodiment, the systems, methods, and non-transitory computer readable media are configured to determine a product of the value and a term to dampen the value, the term being based at least in part on a number of times the user performed the negative action over a period of time.

In an embodiment, the term is a fraction having a numerator of 1 and a denominator of h, wherein h represents a number of times the user performed the negative action over a period of time.

In an embodiment, the negative action corresponds to a hide action, and wherein h represents a number of times the user hid content items over a period of time.

In an embodiment, the systems, methods, and non-transitory computer readable media are configured to determine a product of the value and a term to dampen the value, the term being based at least in part on a set of probabilities that each correspond to the user performing the positive action at some percentile.

In an embodiment, the term is a fraction having a numerator corresponding to a probability of the user performing the action at a first percentile and a denominator corresponding to a sum of probabilities of the user performing the action at at least a second percentile and a third percentile.

In an embodiment, the content item is an image, video, audio file, page, user profile, group, story, or post.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
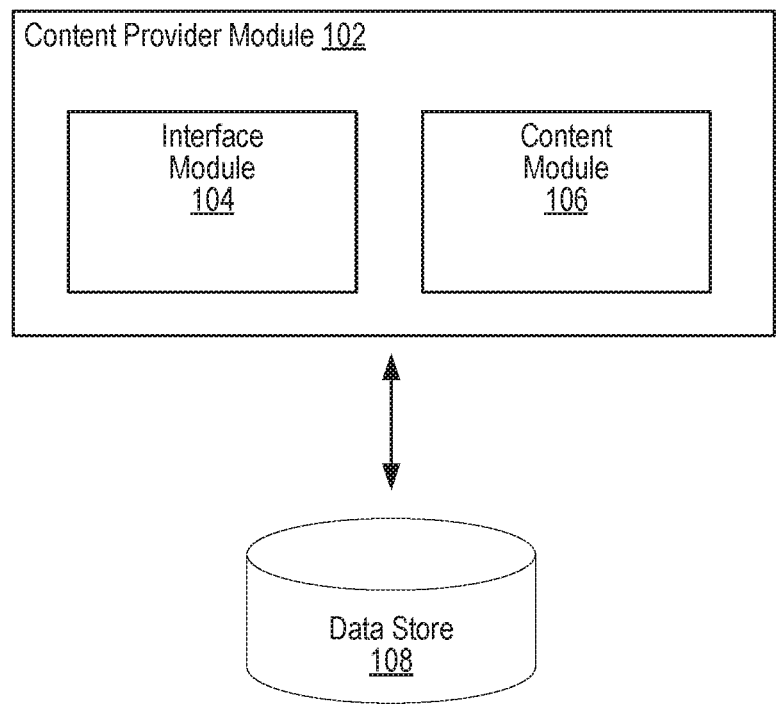
FIG. 1 illustrates an example system including an example content provider module configured to provide content to users, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Presentation

People use computing devices (or systems) for a wide variety of purposes. As mentioned, under conventional approaches, a user can utilize a computing device to share content items (e.g., documents, images, videos, audio, etc.) with other users. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

In some instances, a user operating a computing device can interact with a content provider interface (e.g., a software application running on the computing device, web browser, etc.) to access content items. Such content items, or snippets (e.g., title, summary, text excerpt, images, frames, etc.) of content items, can be presented through the interface as part of a content feed, for example. Users can navigate (e.g., browse) the content feed, for example, by scrolling or performing some gesture through a display screen of the computing device, to access the different content items that are available in the content feed. At any given time, there may be a large number of content items that are presented in a user's content feed.

In general, a respective score is generated for each content item that is eligible to be presented in the user's content feed. In various embodiments, a content item can be an image, video, audio file, page, user profile, group, story, place (e.g., point of interest, city, etc.), or post, to name some examples. A content item's score can be used to determine whether the content item is presented in the user's content feed, for example, based on the content item's score satisfying a threshold score, and also the rank in which the content item is presented in the content feed. Typically, each content item is scored with respect to a user. In other words, the same content item can have a different score depending on the user. The score for each content item can be determined, for example, based on a sum of values that correspond to various events. The value for each event can be determined based, in part, on a likelihood of the user performing some action (e.g., like, hide, comment, share, etc.). For example, one event can correspond to a likelihood of the user "liking" a content item (e.g., by selecting a "like" option associated with the content item). In this example, the value for this event can be determined as follows: $P_{like}*W_{like}$, where $P_{like}$ represents a probability that the user will like the content item and $W_{like}$ represents a weight associated with the "like" action. In various embodiments, the respective probabilities for each user performing various actions (e.g., like, hide, share, comment, watch a video, etc.) are obtained from a trained machine learning model.

In some instances, scoring content items using the approach described above can result in a sub-optimal experience for some users when those users excessively perform certain action(s) more so than an average user. For example, a user may tend to select the like option, for example, for an above-average number of content items that appear in the user's content feed. As a result, the user's $P_{like}$ value (i.e., the likelihood of the user liking a content item) may become much larger than that of an average user. This behavior can result in the scores determined for content items based, in part, on the user's $P_{like}$ value to become anomalous when compared to that of an average user. Such anomalies can result in a sub-optimal experience for the user which may involve, for example, the exclusion of content items that would normally be included in the user's content feed and/or reducing the respective contributions to the score by other events (e.g., a likelihood of the user sharing the content item). Accordingly, such conventional approaches can be inconvenient to users and may not be effective in addressing these and other problems arising in computer technology.

An improved approach rooted in computer technology overcomes the foregoing and other disadvantages associated with conventional approaches specifically arising in the realm of computer technology. In various embodiments, content items can be scored to prevent anomalies that may arise due to abnormal user behavior, as described above. In some embodiments, the values of one or more events that are used to determine a content item score can be adjusted (e.g., increased or decreased) by some factor, or amount, so that content items can be scored optimally. As a result, users that exhibit abnormal behavior, which may involve performing some action more frequently or less frequently than an average user, can still have an optimal browsing experience with respect to their content feed.

FIG. 1 illustrates an example system 100 including an example content provider module 102 configured to provide content to users, according to an embodiment of the present disclosure. As shown in the example of FIG. 1, the content provider module 102 can include an interface module 104 and a content module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. It should be understood that there can be many variations or other possibilities.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102 including, for example, content items that are available for access through the social networking system as well as data for various users describing their respective likelihoods of performing various actions with respect to content items. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

In various embodiments, the content provider module 102 can utilize the interface module 104 and the content module 106 to provide content items to users. The interface module 104 can be configured to provide an interface (e.g., graphical user interface) through which content items can be presented and accessed. For example, the interface can be provided through a software application (e.g., social networking application) running on a computing device being operated by a user. The user can interact with the interface, for example, by performing touch screen gestures through a display screen of the computing device. As mentioned, in some embodiments, content items can be presented through the interface as part of a content feed, which the user can navigate to access or browse content items. As mentioned, each content item can be scored and ranked in the content feed based on its respective score.

The content module 106 can be configured to provide various types of content items that can be presented to users through the interface provided by the interface module 104. More details regarding the content module 106 will be provided below in reference to FIG. 2.

Figure 2:
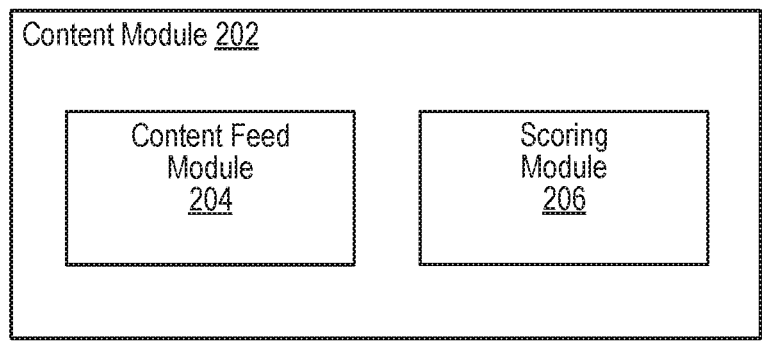
FIG. 2 illustrates an example of a content module configured to provide content items through content feeds, according to an embodiment of the present disclosure.

FIG. 2 illustrates an example of a content module 202 configured to provide content items, according to an embodiment of the present disclosure. In some embodiments, the content module 106 of FIG. 1 can be implemented with the content module 202. As shown in the example of FIG. 2, the content module 202 can include a content feed module 204 and a scoring module 206.

In various embodiments, the content feed module 204 provides the content items through a respective content feed (e.g., news feed) that is customized for each user of the social networking system. The content feed can include content items (or stories) that have been selected for presentation to the user. Such content items may be selected from various content items that may be provided (e.g., uploaded or shared) by other users of the social networking system or by various third-party content publishers, for example.

In various embodiments, the scoring module 206 is configured to score each content item that is eligible for inclusion in a user's content feed. Such scores are then used to determine whether a content item should be included in the user's content feed, for example, based on the content item's score satisfying a threshold score as well as the order in which the content item is presented in the content feed. More details regarding the scoring module 206 will be provided below in reference to FIG. 3.

Figure 3:
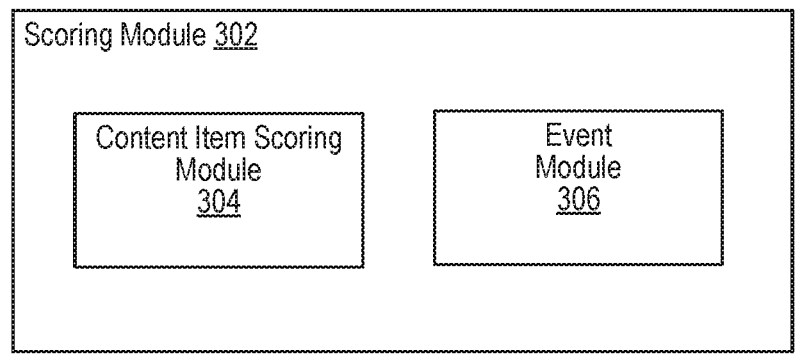
FIG. 3 illustrates an example of a scoring module configured to score content items, according to an embodiment of the present disclosure.

FIG. 3 illustrates an example of a scoring module 302 configured to score content items, according to an embodiment of the present disclosure. In some embodiments, the scoring module 206 of FIG. 2 can be implemented with the scoring module 302. As shown in the example of FIG. 3, the scoring module 302 can include a content item scoring module 304 and an event module 306.

The content item scoring module 304 is configured to determine a respective score for each content item. In general, the score generated for a content item is specific to a user. In other words, the same content item can have a different score depending on the user. In various embodiments, the score generated for each content item is determined based on one or more events. In general, each event corresponds to some action and the value determined for the event is based on a likelihood of a user performing that action. One example event corresponds to a "like" action and this event can measure a likelihood of a particular user liking a content item (e.g., by selecting a "like" option associated with the content item) as follows:

$$E_{like} = P_{like} * W_{like},$$

where $E_{like}$ represents the value determined for the "like" event, where $P_{like}$ represents a user specific probability that the user will like the content item, and where $W_{like}$ represents a weight associated with the like action. As shown, the $P_{like}$ value can be adjusted by a corresponding weight value $W_{like}$. Each event can be assigned its own respective weight value which may be some numerical value. This weight can be used to increase or decrease the effect an event has on the overall score for a content item.

In various embodiments, the score generated for each content item is based on a sum of values that correspond to various events. One example approach for calculating the score of a content item with respect to a user is as follows:

$$Score_{content\ item} = E_1 + \ldots + E_n$$

where $E_1$ represents a value determined for a first event with respect to the user and where $E_n$ represents a value determined for an event n with respect to the user.

As shown, the score for a content item can be determined based on other events in addition to the like action. Another example event includes a hide action, which measures a likelihood of a user hiding a content item (e.g., by selecting a "hide" option associated with the content item). Similarly, there can be additional events that each correspond to one of: a likelihood of the user sharing the content item (e.g., by selecting a "share" option associated with the content item), a likelihood of the user commenting on the content item (e.g., by submitting a comment to be posted with the content item), a likelihood of the user watching the content item (e.g., watching a video), to name some examples.

In some embodiments, the weight assigned to an event can vary depending on whether the event is considered a positive action or a negative action. In general, an event that is considered a positive action causes the score for a content item to increase, such as a like action, a comment action, a share option, reading or watching a content item, etc. For these events, their corresponding weight is typically a positive value so that the values determined of these events (e.g., $P_n * W_n$) causes the overall score for the content item to increase. In such embodiments, a content item having a higher score increases the chances of the score satisfying a threshold score, which typically results in the content item being included in the user's content feed. Weights may be assigned in a manner that reflects the relative importance of one event over another. For example, a like action may be weighted using a first value, e.g., 5, whereas a comment action can be weighted higher, e.g., 50, to amplify its contribution to the overall score for the content item. In contrast, some events may be associated with a negative action, such as the hide action. For these events, their corresponding weight is typically a negative value so that the values determined of these events (e.g., $P_n * W_n$) causes the overall score for the content item to decrease. For example, a hide action may be associated with a negative weight, e.g., −100, so that the value determined for this event (e.g., $P_{hide}*(-100)$), causes the overall score for the content item to decrease.

As mentioned, in some instances, users can perform actions that cause the values determined for one or more events to become anomalous, thereby affecting the overall content item scores that are determined for such users. For example, a user may tend to select the like option for an above-average number of content items that appear in the user's content feed. As a result, the user's $P_{like}$ value (i.e., the likelihood of the user liking a content item) may become much larger than that of an average user. This behavior can result in the scores determined for content items based, in part, on the user's $P_{like}$ value to become anomalous when compared to that of an average user. Such anomalies can result in a sub-optimal experience for the user which may involve, for example, the exclusion of content items that would normally be included in the user's content feed.

In various embodiments, the event module 306 can be configured to apply event-specific approaches to prevent anomalous content item scores from being generated. As mentioned, the score generated for each content item can be based on a sum of values that each correspond to an event. Each event typically corresponds to some action and the value determined for the event is based on a likelihood of a user performing that action. Thus, any one event can cause the score determined for a content item to become anomalous.

In various embodiments, the approach applied to an event depends on the event type. In one example, a user that selects the hide option for an above-average number of content items can cause the user's $P_{hide}$ value (i.e., the likelihood of the user selecting a hide option associated with a content item) to become much larger than that of an average user. As mentioned, this behavior can result in the scores determined for content items based, in part, on the user's $P_{hide}$ value to become anomalous when compared to that of an average user. In some embodiments, the event module 306 adjusts the value determined for the event corresponding to the hide option based on the number of times the user selected the hide option over some period of time (e.g., one week, month, year, etc.). For example, in some embodiments, the value determined for the event corresponding to the hide option can be adjusted by a term T as follows:

$$E_{hide}=P_{hide}*T*W_{hide},$$

where $E_{hide}$ represents the value determined for the "hide" event, where $P_{hide}$ represents a user specific probability that the user will hide the content item, where $W_{hide}$ represents a weight associated with the hide action, where T is a fraction having a numerator of 1 and a denominator of h (i.e., T=1/h), and where h represents the number of times the user selected the hide option for content items over some period of time. Using this approach, the value determined for the hide event, $E_{hide}$, is damped by the number of times the user selected the hide option. In other words, the $E_{hide}$ value for a user that excessively selects the hide option is normalized by the term T despite the likelihood of that user hiding content items, $P_{hide}$, being abnormally high. Users that do not frequently hide content items are less affected by the term T. This approach described above may be used for other negative action events as well.

Figure 4:
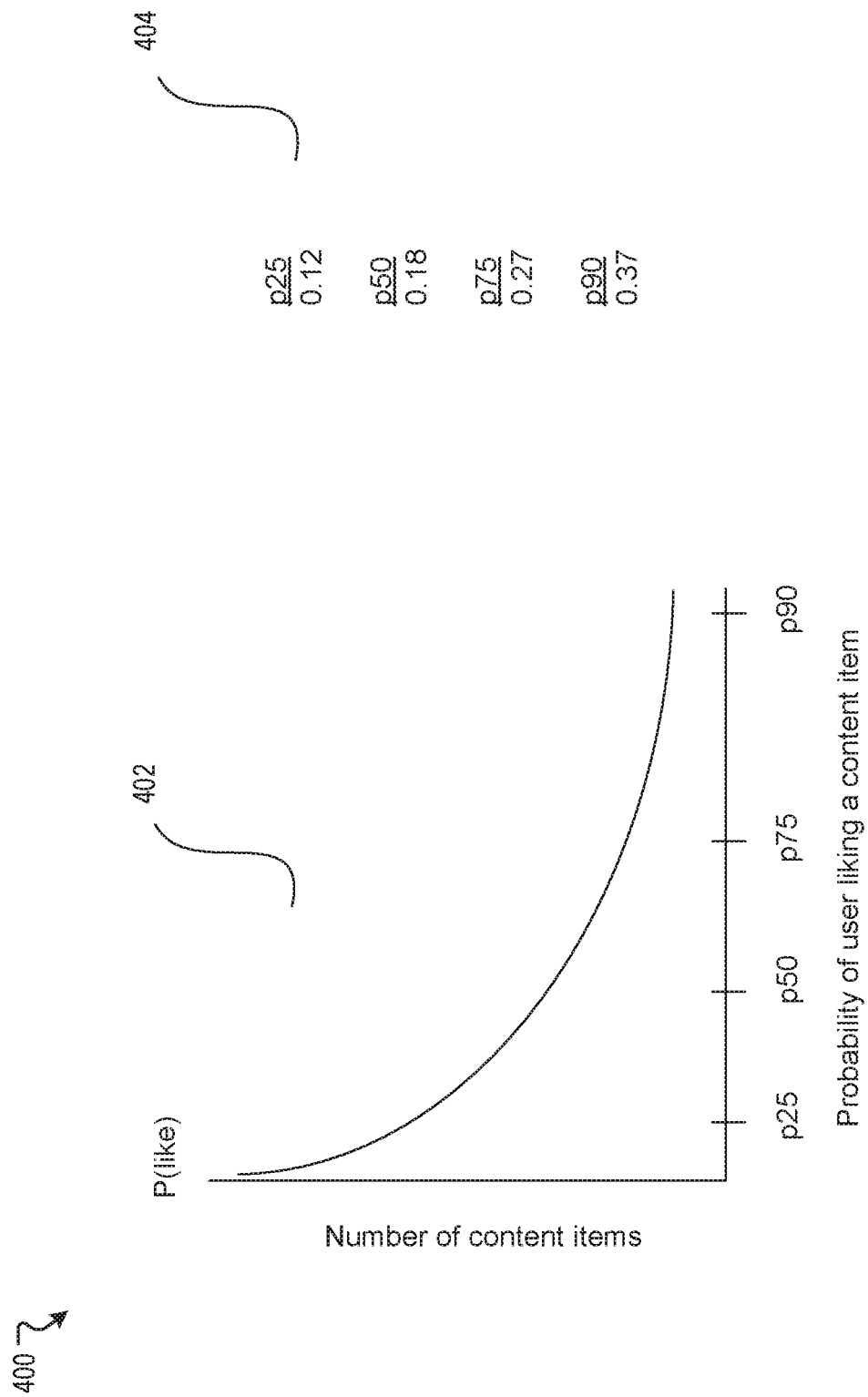
FIG. 4 illustrates an example method for scoring content items, according to an embodiment of the present disclosure.

The event module 306 can be configured to apply separate approaches to other types of events. As mentioned, other example events can include a like event (e.g., based on a likelihood of a user liking a content item), a share event (e.g., based on a likelihood of a user sharing a content item), a comment event (e.g., based on a likelihood of a user commenting on a content item), a watch event (e.g., based on a likelihood of a user watching a content item, such as a video). In some instances, a user with a high likelihood of performing some action (e.g., like, share, comment, etc.) causes the value for the event corresponding to that action to become high. This can result in the respective contributions of other events included in the content item score calculation (e.g., the share event, comment event, etc.) to diminish. For example, a user with a high likelihood of "liking" content items causes the user's like event (e.g., $E_{like}=P_{like}*W_{like}$) to become high. As a result, other events included in the content item score calculation have a reduced impact on the overall score calculated for a content item. To prevent this result, in some embodiments, the event module 306 adjusts the value determined for an event based on a set of percentiles (e.g., p25, p50, p75, p90, etc.) that correspond to a respective probability of a user performing an action corresponding to the event. Using the like event as an example, the event module 306 can determine the respective probabilities of a user liking a content item at the $25^{th}$ percentile (i.e., p25), the $50^{th}$ percentile (i.e., p50), the $75^{th}$ percentile (i.e., p75), and the $90^{th}$ percentile (i.e., p90). Such percentiles can be determined from a probability distribution, as illustrated in FIG. 4. The set of percentiles (e.g., p25, p50, p75, p90, etc.) that correspond to a respective probability of a user liking a content item can be determined based on this probability distribution. In one example, the p25 probability for a user may be 0.12, the p50 probability for the user may be 0.18, the p75 probability for the user may be 0.27, and the p90 probability for the user may be 0.37. In some embodiments, the value determined for the event corresponding to the like option can be adjusted by a set of percentiles as follows:

$$E_{like}=P_{like}*T*W_{like},$$

where $E_{like}$ represents the value determined for the "like" event, where $P_{like}$ represents a user specific probability that the user will like the content item, where $W_{like}$ represents a weight associated with the like action, and where T is a fraction having a numerator corresponding to the first percentile probability (e.g., the probability of the user liking a content item at the $x^{th}$ percentile) and a denominator corresponding to at least a second percentile probability (e.g., the probability of the user liking a content item at the $y^{th}$ percentile). For example, in some embodiments T is a fraction having a numerator of p90 and a denominator of a sum of p25, p50, and p75, e.g., $$T = \frac{p90}{(p25 + p50 + p75)}.$$

The set of percentiles used for can vary depending on the implementation. For example, in some embodiments, $$T = \frac{p95}{(p25 + p50 + p75)}.$$

Using this approach, the value determined for the like event, $E_{like}$, is devalued for users that tend to excessively like content items. In other words, the $E_{like}$ value for a user that excessively selects the like option is normalized by the term T despite the likelihood of that user liking content items, $P_{like}$, being abnormally high. In some embodiments, the respective values determined for other events (e.g., positive action events such as the comment event and the share event) are also adjusted by a set of percentiles as described above.

FIG. 4 illustrates an example probability distribution 402 for a user liking a content item. In various embodiments, the probability distribution 402 can be generated separately for each user of the social networking system. In the example probability distribution 402, the y-axis corresponds to the number of content items and the x-axis corresponds to the probability of the user liking a content item. A set of percentiles (e.g., p25, p50, p75, p90, etc.) 404 can be determined using the probability distribution 402. Such percentiles can be used to adjust values for various events (e.g., events corresponding to positive actions), for example.

Figure 5:
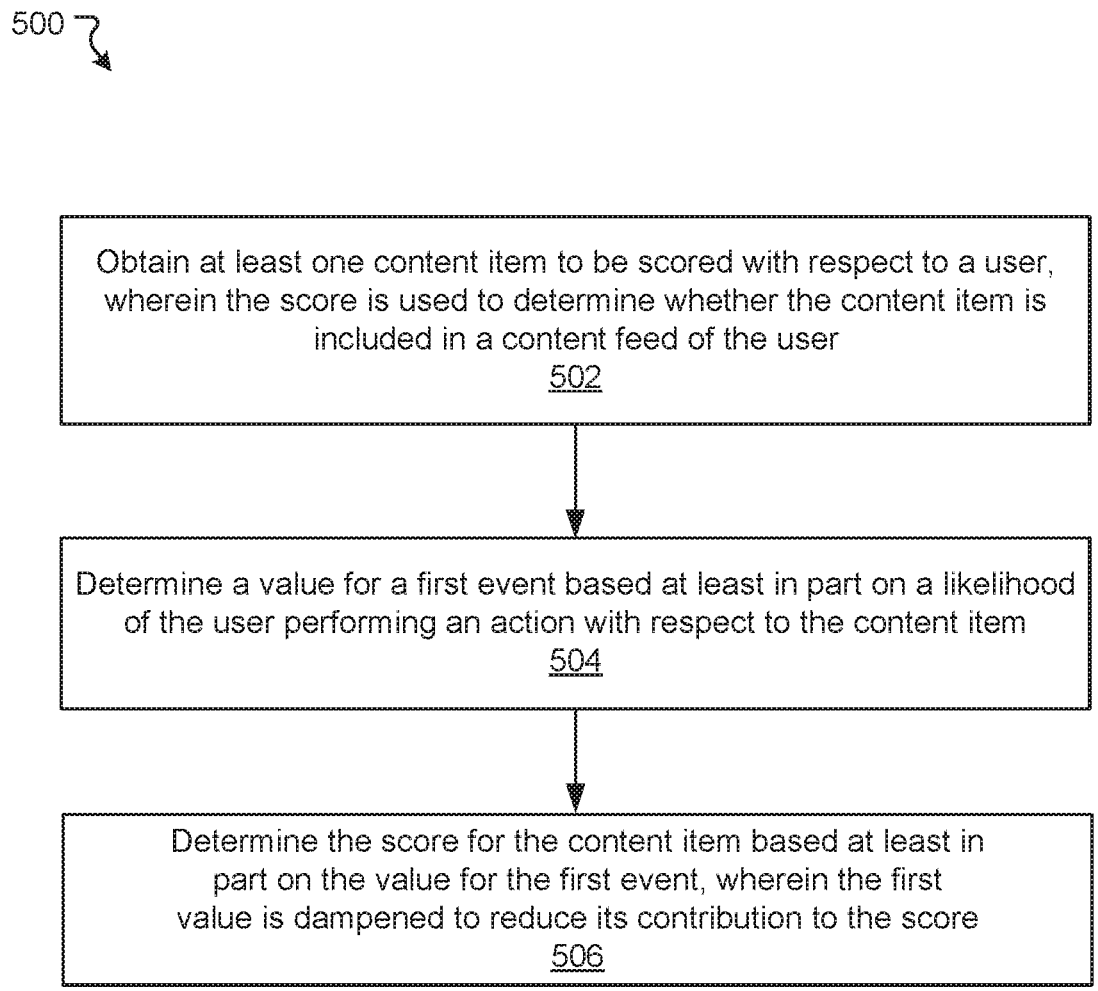
FIG. 5 illustrates an example method for scoring content items, according to an embodiment of the present disclosure.

FIG. 5 illustrates an example method 500 for scoring content items, according to an embodiment of the present disclosure. It should be appreciated that there can be additional, fewer, or alternative steps performed in similar or alternative orders, or in parallel, within the scope of the various embodiments discussed herein unless otherwise stated. At block 502, at least one content item to be scored with respect to a user is obtained, wherein the score is used to determine whether the content item is included in a content feed of the user. At block 504, a value for a first event is determined based at least in part on a likelihood of the user performing an action with respect to the content item, wherein the likelihood of the user performing the action is greater than an average user of the social networking system. At block 506, the score for the content item is determined based at least in part on the value for the first event, wherein the first value is dampened to reduce its contribution to the score.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
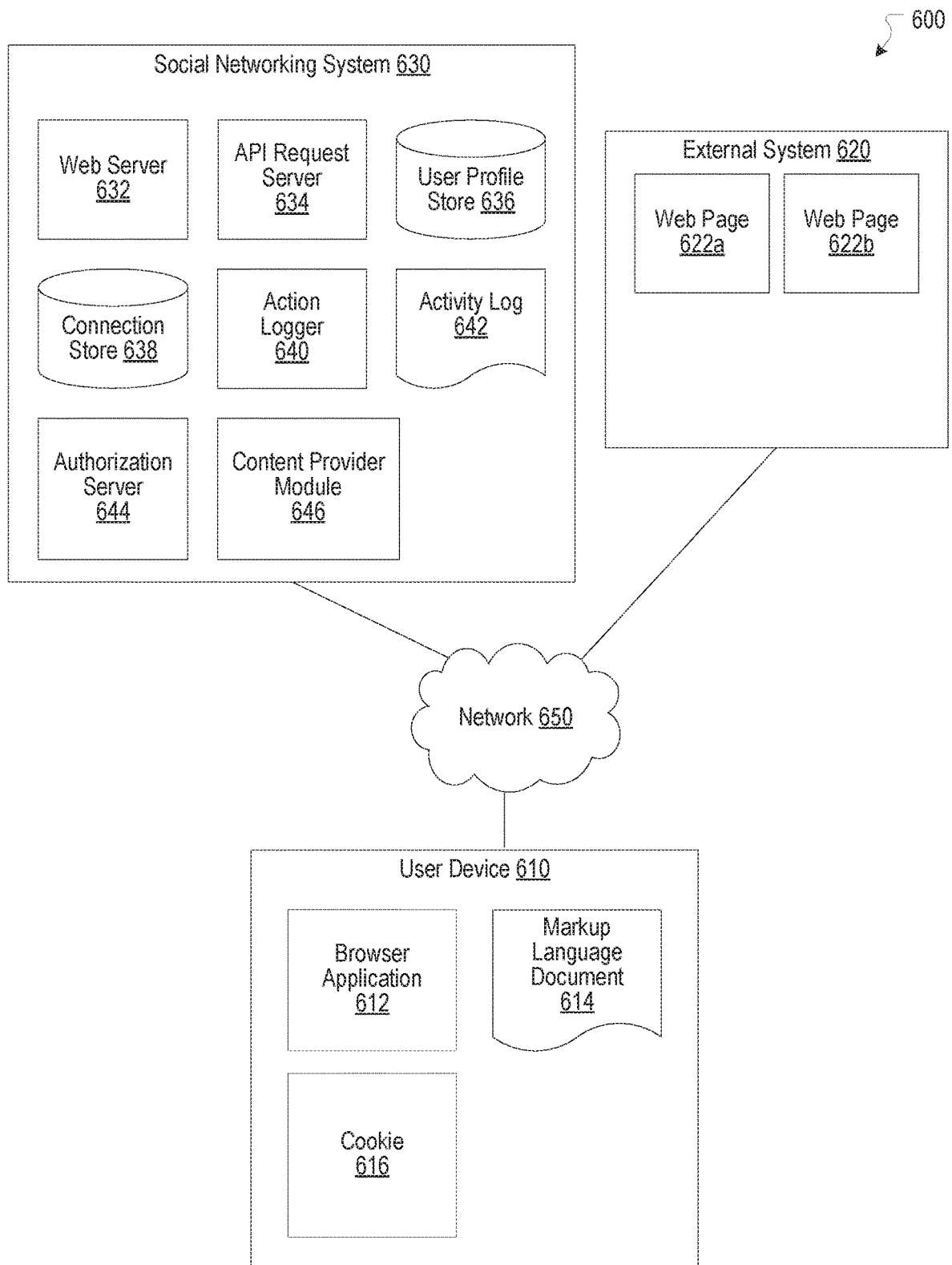
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. As discussed previously, it should be appreciated that there can be many variations or other possibilities.

Hardware Implementation

Figure 7:
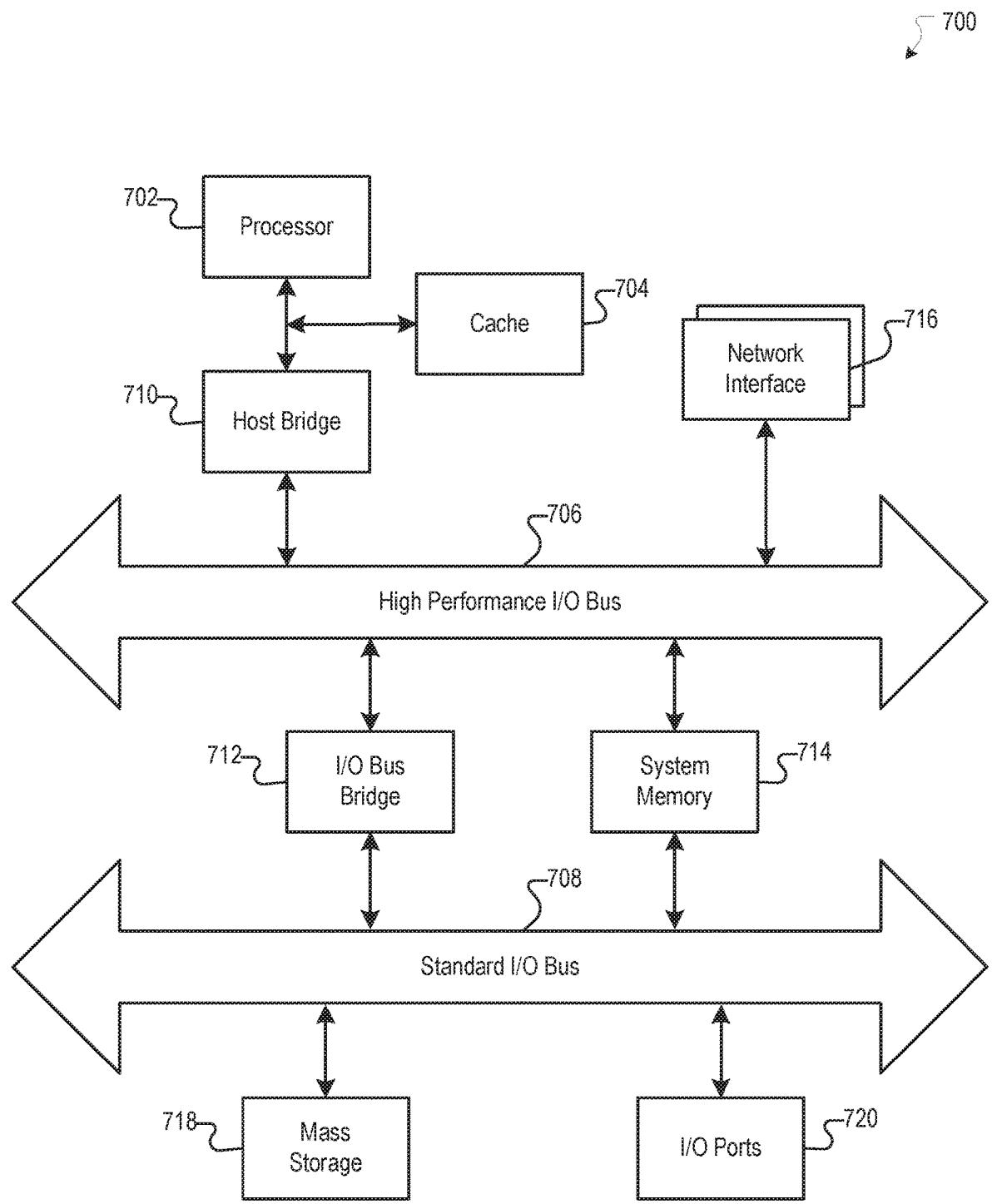
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a social networking system, at least one content item to be scored with respect to a user, wherein a score is used to determine whether the content item is included in a content feed determined for the user by the social networking system;
    determining, by the social networking system, a first value for a first event based at least in part on a likelihood of the user performing a first action with respect to the content item through the social networking system, wherein the first action is associated with a negative action with respect to the content item;
    determining, by the social networking system, that the likelihood of the user performing the first action is greater than a likelihood of an average user of the social networking system performing the first action with respect to the content item;
    determining, by the social networking system, a second value for a second event based at least in part on a likelihood of the user performing a second action with respect to the content item, wherein the second action is associated with a positive action with respect to the content item;
    determining, by the social networking system, the score for the content item based at least in part on the first value for the first event and the second value for the second event, wherein the first value and the second value are dampened to reduce respective contributions to the score, wherein the determining the score for the content item further comprises:
    determining, by the social networking system, a first product of the first value and a term that dampens the first value when multiplied to the first value, the term being based at least in part on a number of times the user performed the first action over a specified period of time;
    determining, by the social networking system, a second product of the second value and a second term that dampens the second value when multiplied to the second value, the second term being based at least in part on a set of probabilities that each correspond to the user performing the positive action at a respective percentile,
    wherein the second term is a fraction having a numerator based on a probability of the user performing the second action at a first percentile and a denominator based on a sum of probabilities of the user performing the second action at a second percentile and a third percentile; and determining, by the social networking system, the score for the content item based at least in part on a sum of the first product and the second product; and
    providing, by the social networking system, the content item to the user in the content feed based on the score.

2. The computer-implemented method of claim 1, wherein determining the first value for the first event further comprises:
    determining, by the social networking system, a product of the likelihood of the user performing the first action with respect to the content item and a corresponding weight for the first action.

3. The computer-implemented method of claim 1, wherein the term is based on a fraction having a numerator of 1 and a denominator of h, wherein h represents a number of times the user performed the negative action over the specified period of time.

4. The computer-implemented method of claim 3, wherein the negative action corresponds to a hide action, and wherein h represents a number of times the user hid content items over the specified period of time.

5. The computer-implemented method of claim 1, wherein the content item is at least one of an image, video, audio file, page, user profile, group, story, or post.

6. The computer-implemented method of claim 1, wherein the positive action is associated with at least one of a like event, a share event, a comment event, or a watch event.

7. A system comprising:
    at least one processor; and
    a memory storing instructions that, when executed by the at least one processor, cause the system to perform:
    obtaining at least one content item to be scored with respect to a user, wherein a score is used to determine whether the content item is included in a content feed determined for the user by a social networking system;
    determining a first value for a first event based at least in part on a likelihood of the user performing a first action with respect to the content item through the social networking system, wherein the first action is associated with a negative action with respect to the content item;

determining that the likelihood of the user performing the first action is greater than a likelihood of an average user of the social networking system performing the first action with respect to the content item;

determining a second value for a second event based at least in part on a likelihood of the user performing a second action with respect to the content item, wherein the second action is associated with a positive action with respect to the content item;

determining the score for the content item based at least in part on the first value for the first event and the second value for the second event, wherein the first value and the second value are dampened to reduce respective contributions to the score, wherein the determining the score for the content item further comprises:

determining a first product of the first value and a term that dampens the first value when multiplied to the first value, the term being based at least in part on a number of times the user performed the first action over a specified period of time;

determining a second product of the second value and a second term that dampens the second value when multiplied to the second value, the second term being based at least in part on a set of probabilities that each correspond to the user performing the positive action at a respective percentile, wherein the second term is a fraction having a numerator based on a probability of the user performing the second action at a first percentile and a denominator based on a sum of probabilities of the user performing the second action at a second percentile and a third percentile; and determining the score for the content item based at least in part on a sum of the first product and the second product; and providing the content item to the user in the content feed based on the score.

8. The system of claim 7, wherein determining the first value for the first event further causes the system to perform:

determining a product of the likelihood of the user performing the first action with respect to the content item and a corresponding weight for the first action.

9. The system of claim 7, wherein the term is based on a fraction having a numerator of 1 and a denominator of h, wherein h represents a number of times the user performed the negative action over the specified period of time.

10. The system of claim 9, wherein the negative action corresponds to a hide action, and wherein h represents a number of times the user hid content items over the specified period of time.

11. The system of claim 7, wherein the content item is at least one of an image, video, audio file, page, user profile, group, story, or post.

12. The system of claim 7, wherein the positive action is associated with at least one of a like event, a share event, a comment event, or a watch event.

13. The system of claim 7, wherein the first percentile, the second percentile, and the third percentile are determined from a probability distribution.

14. A non-transitory computer-readable storage medium including instructions that, when executed by at least one processor of a computing system, cause the computing system to perform a method comprising:

obtaining at least one content item to be scored with respect to a user, wherein a score is used to determine whether the content item is included in a content feed determined for the user by a social networking system;

determining a first value for a first event based at least in part on a likelihood of the user performing a first action with respect to the content item through the social networking system, wherein the first action is associated with a negative action with respect to the content item;

determining that the likelihood of the user performing the first action is greater than a likelihood of an average user of the social networking system performing the first action with respect to the content item;

determining a second value for a second event based at least in part on a likelihood of the user performing a second action with respect to the content item, wherein the second action is associated with a positive action with respect to the content item;

determining the score for the content item based at least in part on the value for the first event and the second value for the second event, wherein the first value and the second value are dampened to reduce respective contributions to the score, wherein the determining the score for the content item further comprises:

determining a first product of the first value and a term that dampens the first value when multiplied to the first value, the term being based at least in part on a number of times the user performed the first action over a specified period of time:

determining a second product of the second value and a second term that dampens the second value when multiplied to the second value, the second term being based at least in part on a set of probabilities that each correspond to the user performing the positive action at a respective percentile, wherein the second term is a fraction having a numerator based on a probability of the user performing the second action at a first percentile and a denominator based on a sum of probabilities of the user performing the second action at a second percentile and a third percentile; and determining, by the social networking system, the score for the content item based at least in part on a sum of the first product and the second product; and providing the content item to the user in the content feed based on the score.

15. The non-transitory computer-readable storage medium of claim 14, wherein determining the first value for the first event further causes the computing system to perform:

determining a product of the likelihood of the user performing the first action with respect to the content item and a corresponding weight for the first action.

16. The non-transitory computer-readable storage medium of claim 14, wherein the term is based on a fraction having a numerator of 1 and a denominator of h, wherein h represents a number of times the user performed the negative action over the specified period of time.

17. The non-transitory computer-readable storage medium of claim 16, wherein the negative action corresponds to a hide action, and wherein h represents a number of times the user hid content items over the specified period of time.

18. The non-transitory computer-readable storage medium of claim 14, wherein the content item is at least one of an image, video, audio file, page, user profile, group, story, or post.

19. The non-transitory computer-readable storage medium of claim 14, wherein the positive action is associated with at least one of a like event, a share event, a comment event, or a watch event.

20. The non-transitory computer-readable storage medium of claim 14, wherein the first percentile, the second percentile, and the third percentile are determined from a probability distribution.

\* \* \* \* \*